United States Patent
Ando et al.

[15] 3,668,072
[45] June 6, 1972

[54] FERMENTATION PROCESS FOR THE PRODUCTION OF L-ORNITHINE

[72] Inventors: Kunio Ando, Kawasaki-shi; Hideo Oishi, Tokyo, both of Japan

[73] Assignee: Chugai Seiyaku Kabushiki Kaisha, Tokyo, Japan

[22] Filed: Jan. 2, 1969

[21] Appl. No.: 788,659

Related U.S. Application Data

[63] Continuation-in-part of Ser. No. 724,299, Feb. 5, 1968, abandoned, which is a continuation of Ser. No. 469,307, July 2, 1965, abandoned.

[52] U.S. Cl. ................................................................. 195/29
[51] Int. Cl. ............................................................ C12d 13/06
[58] Field of Search ............................................. 195/29, 47

[56] References Cited

UNITED STATES PATENTS

| | | | |
|---|---|---|---|
| 2,988,489 | 6/1961 | Kinoshita et al. | 195/47 |
| 3,374,150 | 3/1968 | Noguchi et al. | 195/47 |

OTHER PUBLICATIONS

Kinoshita article in Proceedings of the Fifth International Congress of Biochemistry, Moscow 1961, Vol. 8, pp. 43–52 (published 1963)

*Primary Examiner*—Lionel M. Shapiro
*Attorney*—Polachek & Saulsbury

[57] ABSTRACT

L-ornithine can be produced by cultivating an auxotrophic mutant of Escherichia coli which requires arginine or citrulline, but not ornithine for the growth in a cultivation medium containing assimilable carbon, nitrogen sources, inorganic ions and arginine or citrulline, phosphate ion of said medium being limited to about $0.5 - 3.5\mu$ mole/ml, under aerobic condition.

4 Claims, No Drawings

FERMENTATION PROCESS FOR THE PRODUCTION OF L-ORNITHINE

This application is a continuation-in-part of our earlier filed copending application Ser. No. 724,299 filed on Feb. 5, 1968, now abandoned said earlier application being a continuation of our first earlier filed application Ser. No. 469,307 filed July 2, 1965, now abandoned.

This invention relates to a fermentation process for the production process of L-ornithine and more particularly to the production of L-ornithine using an auxotrophic mutant of Escherichia coli.

It is well known that L-ornithine plays an important role on the metabolism of the living body as a member of the ornithine cycle in the production of urea and has an excellent effect on the detoxication of ammonia.

Hitherto, L-ornithine has been produced by a fermentation method or a synthesizing method, mainly by the former using arginine— or citrulline—requiring mutant of Micrococcus glutamicus known as glutamic acid producing bacteria. The method using Micrococcus glutamicus is good for the production of L-ornithine, but yield is not only still so enough, but also the microorganism often requires biotin for the growth, different from the case of glutamic acid formentation, or control of the pH of the medium during the fermentation by the addition of urea, and further it often requires the addition of surface active agent to the medium to produce L-ornithine.

An object of this invention is to provide an improved new fermentation process for the production of L-ornithine.

Another object of this invention is to provide more efficacious and simple fermentation process for the production of L-ornithine.

A further object of this invention is to provide a fermentation process for the production of L-ornithine whereby L-ornithine can be obtained in high purity and good yield.

A still further object of this invention is to provide a fermentation process for the production of L-ornithine whereby L-ornithine can be advantageously obtained on industrial scale.

This invention bases our new finding that certain auxotrophic mutants derived by ultraviolet irradiation from a stock culture strain of Escherichin coli accumulate a great amount of L-ornithine in the medium, if it is cultivated in a cultivation medium containing assimilable carbon, nitrogen sources, inorganic ions and arginine or citrulline, phosphate ions of said medium being limited to about $0.5 - 3.5\mu$ mole/ml. The auxotrophic mutant is strains which requires arginine or citrulline, but not ornithine for the growth. One of the typical strain was deposited to American Type Culture Collection, 12301 Parklawn Drive, Rockville, Maryland 20852 under the number of ATCC 21104.

According to the present invention, L-ornithine can be obtained by (a) cultivating an auxotrophic mutant of Escherichia coli which requires arginine or citrulline, but not ornithine for the growth in a cultivation medium containing assimilable carbon, nitrogen sources, inorganic ions and arginine or citrulline, phosphate ion of said medium being limited to about $0.5 - 3.5\mu$ mole/ml, under aerobic condition; (b) accumulating L-ornithine in said medium; and (c) recovering said L-ornithine. As for the medium components, ordinal assimilable carbon and nitrogen sources and ordinal inorganic salt may be used, for example, there may be mentioned glucose, sucrose hydrolysate, starch hydrolysate and waste molasses hydrolysate as carbon source, meat extract, peptone, ammonium sulfate, ammonium chloride and corn steep liquor as nitrogen source, and as inorganic salts potassium hydrogen phosphate, ferric sulfate, ferric chloride and the like may be used optionally at need.

Arginine or citrulline is to be added to the medium in a little less amount than that of best growth, preferably $0.3 - 1.0\mu$ mole/ml, and it would rather be advantageous to use arginine than to use citrulline because arginine is cheaper than citrulline. This arginine may be replaced by the other natural substance which contains arginine, for example, peptone, meat extract, yeast extract, corn steep liquor, and protein hydrolysate, but it goes without saying that the concentration is to be a little less amount than that of best growth as the same in pure arginine.

Phosphate ion may be supplied with various organic and inorganic phosphates, for example, dipotassium phosphate.

The cultivation is carried out at a temperature from 28° to 32° C under aerobic condition, whereby L-ornithine is accumulated in the cultivation medium and accumulated L-ornithine may be separated purely by the conventional method usually used for amino acid separation, for example, ion exchange resin treatment or concentration to syrup, after the removal of the cell by filtration or centrifugation.

It has not been known that non-glutamic acid producing bacteria such as Escherichia coli accumulates L-ornithine in the medium, if it is cultivated in a cultivation medium, phosphate ion concentration being limited to a certain range and the yield of L-ornithine is over 35 percent (molar ratio) of glucose initially contained in the medium. The process of this invention is so efficacious and simple that it is suitable to industrial scale production.

The following examples which are intended as informance and typical only and not in a limiting sense will further illustrate the invention.

Example 1

An auxotrophic mutant Escherichia coli B–19–19 (ATCC No. 21104) derived from the parent strain Escherichia coli B–19 (stock culture of Inst. For Infectious Diseases, The University of Tokyo) by ultraviolet irradiation method, which requires arginine or citrulline, but not ornithine for the growth, was cultivated under shaking at 30° C for 96 hours using the following medium (pH: 6.0):

| | |
|---|---|
| glucose | 5% |
| ammonium sulfate | 1.5% |
| dipotassium phosphate | 0.025% or 0.1% |
| magnesium sulfate | 0.03% |
| L-arginine hydrochloride | 0.012% or 0.03% |
| calcium carbonate | 2% |

The amounts of the cell (mg/ml) and the formed L-ornithine (mg/ml) were determined and summarized in the following table:

| Exp. No. | Concentration in the medium | | Analysis after fermentation | |
|---|---|---|---|---|
| | $K_2HPO_4$ (%) | L-arginine hydrochloride (%) | Amount of the cells (mg/ml) | L-ornithine (mg/ml) |
| 1 | 0.025 | 0.012 | 4.2 | 16.7 |
| 2 | 0.100 | 0.012 | 9.6 | 0.9 |
| 3 | 0.025 | 0.030 | 7.1 | trace |
| 4 | 0.100 | 0.030 | 11.0 | 0.1 |

(In the table, the amount of L-ornithine is shown as that of hydrochloride salt).

As shown in the above table, it is most advantageous to use the medium containing 0.025 percent of dipotassium phosphate and 0.012 percent of arginine hydrochloride. Further, it was clarified that effect of dipotassium phosphate to the yield of L-ornithine was caused by phosphate ion and not by the potassium ion, because the same amount of L-ornithine was obtained in case of cultivating the same bacteria in the same medium supplemented with 0.1% potassium chloride.

Example 2:

To a sterilized cultivation medium (pH: 6.0) containing 5 percent of glucose, 15 percent of ammonium sulfate, 0.04 percent of dipotassium phosphate, 0.03 percent of magnesium sulfate (7 mole hydrate) and 0.01 percent of L-arginine hydrochloride was added calcium carbonate which was separately sterilized by dry-heating to become 2 percent. An auxotrophic mutant Escherichia coli which is able to grow in the minimal medium containing either arginine or citrulline but not in the minimal medium containing ornithine, which was derived from Escherichia coli IAM 1222 (stock culture of Institute of Applied Microbiology, The University of Tokyo) was inoculated to 50 ml of the above cultivation medium poured aseptically into 500 ml-shaking flask and cultivated under aerobic condition at 30° C for 96 hours. After completion of the cultivation, accumulated amount of L-ornithine in the medium was determined to be 15 mg/ml (Yield ratio against consumed glucose added: 32 percent).

After the clarification of the cultivation broth, L-ornithine was isolated by ion exchange treatment and purified as hydrochloride crystals. Yield: 0.6 gr.

Example 3:

To a sterilized cultivation medium (pH: 0.6) containing 6 percent of glucose, 1.5 percent of ammonium sulfate, 0.04 percent of dipotassium phosphate, 0.2 percent of corn steep liquor, 0.03 percent of magnesium sulfate (7 mole hydrate) and 0.012 percent of L-citrulline was added calcium carbonate which was separately sterilized by dry-heating to become 3 percent. An auxotrophic mutant Escherichia coli B-19-19 (ATCC No. 21104), derived from the parent strain Escherichia coli B-19 (stock culture of Inst. for Infectious Diseases, The University of Tokyo) by ultraviolet irradiation method which requires arginine or citrulline, but not ornithine for the growth, was inoculated to 30 ml of the above cultivation medium poured aseptically into 500 ml-shaking flask and cultivated under aerobic condition at 30° C for 80 hours.

After completion of the cultivation, accumulated amount of L-ornithine in the cultivation broth was 15 mg/ml. (Yield ratio against consumed glucose: 32 percent).

What is claimed is:

1. A process for the production of L-ornithine which comprises (a) cultivating an auxotrophic mutant Escherichia coli ATCC No. 21104 which requires an amino acid selected from the group consisting of arginine and citrulline, but not ornithine for the growth in a cultivation medium containing assimilable carbon, nitrogen sources, inorganic ions and an amino acid selected from the group consisting of arginine and citrulline, phosphate ion of said medium being limited to about $0.5 - 3.5$ mole/ml under aerobic condition: (b) accumulating L-ornithine in said medium; and (c) recovering said L-ornithine.

2. A process for the production of L-ornithine which comprises (a) cultivating an auxotrophic mutant Escherichia coli ATCC No. 21104 which requires an amino acid selected from the group consisting of arginine and citrulline, but not ornithine for the growth in a cultivation medium containing assimilable carbon, nitrogen sources, inorganic ions and an amino acid selected from the group consisting of citrulline and arginine, phosphate ion and the amino acid of said medium being a concentration of about $0.5 - 3.5\mu$ mole/ml and $0.3 - 1.0\mu$ mole/ml, respectively, under aerobic condition; (b) accumulating L-ornithine in said medium; and (c) recovering said L-ornithine.

3. A process for the production of L-ornithine which comprises (a) cultivating Escherichia coli ATCC No. 21104 in a cultivation medium containing assimilable carbon, nitrogen sources, inorganic ions and an amino acid selected from the group consisting of citrulline and arginine, phosphate ion of said medium being limited to about $0.5 - 3.5\mu$ mole/ml under aerobic condition: (b) accumulating L-ornithine in said medium: and (c) recovering said L-ornithine.

4. A process for the production of L-ornithine which comprises (a) cultivating Escherichia coli ATCC No. 21104 in a cultivation medium containing assimilable carbon, nitrogen sources, inorganic ions and an amino acid selected from the group consisting of citrulline and arginine, phosphate ion and the amino acid of said medium being a concentration of about $0.5 - 3.5\mu$ mole/ml and $0.3 - 1.0\mu$ mole/ml, respectively, under aerobic condition; (b) accumulating L-ornithine in said medium; and (c) recovering said L-ornithine.

* * * * *